United States Patent [19]

Hannon et al.

[11] 4,163,031

[45] Jul. 31, 1979

[54] POWDER COMPOSITION AND METHOD OF PREPARATION

[75] Inventors: Martin J. Hannon, Martinsville; Alex S. Forschirm, Parsippany, both of N.J.

[73] Assignee: Celanese Corporation, New York, N.Y.

[21] Appl. No.: 844,963

[22] Filed: Oct. 25, 1977

[51] Int. Cl.² .................... C08L 43/04; C08L 53/00; C09L 83/04

[52] U.S. Cl. ............... 525/5; 260/45.85 B; 427/195; 428/35; 525/98

[58] Field of Search ............ 260/876 B, 827, 45.85 B, 260/844, 812, 844, 820

[56] References Cited

U.S. PATENT DOCUMENTS

| | | | |
|---|---|---|---|
| 3,439,064 | 4/1969 | Makowski et al. | 260/827 |
| 3,637,554 | 1/1972 | Childers | 260/876 B |
| 3,985,702 | 10/1976 | Himes | 260/876 B |

*Primary Examiner*—J. Ziegler
*Attorney, Agent, or Firm*—Kenneth A. Genoni

[57] ABSTRACT

A powder composition having good melt flow under zero shear conditions is disclosed. A process for preparing this powder composition is also disclosed. The composition comprises a thermoplastic elastomer such as a block copolymer of styrene and hydrogenated butadiene as well as a melt flow modifier. The melt flow modifier is preferably a partially hydrogenated styrene/alpha methylstyrene random copolymer. The composition may additionally contain adhesion promoters and stabilizers against oxidation and ultraviolet light. A process for coating substrates such as a glass bottle with this composition, as well as the coated glass bottle, is also disclosed.

40 Claims, No Drawings

POWDER COMPOSITION AND METHOD OF PREPARATION

BACKGROUND OF THE INVENTION

1. Field of the Invention

This invention relates to polymeric compositions useful in coating applications. More specifically, this invention relates to polymer compositions having good melt flow under zero shear conditions and useful in coating various substrates such as glass bottles which are employed as containers particularly in the carbonated beverage and beer industries.

2. Description of the Prior Art

The hazards of using glass containers, particularly glass bottles which contain beer or carbonated beverages, are well known. Breakage of such bottles often takes place due to the internal pressure exerted by the pressurized gas in the carbonated beverage or beer as well as by dropping the bottles and other impacts caused by external forces which occur not only in the course of production and distribution of the bottled product, but also as a result of handling of the bottled product by consumers. Such breakage may result in injuries to the human body.

Coatings have been applied to such bottles in order to prevent scattering of the broken glass upon breakage. In this connection, see West German Pat. No. DT2,636,157 and U.S. Pat. No. 3,823,032. The latter patent discloses that thermoplastic elastomers such as block copolymers of styrene and butadiene are useful in coating glass bottles. Thermoplastic elastomeric compositions, having improved environmental resistance, are disclosed in U.S. Pat. No. 3,686,365. These polymeric compositions comprise (a) about 80 to 99 percent of block copolymers having at least two mono alpha alkenyl arene polymer blocks and at least one conjugated diene polymer block and (b) about 20 to 1 percent of a selectively hydrogenated block copolymer having, prior to hydrogenation, at least one mono alpha alkenyl arene polymer block and at least one conjugated diene polymer block, said block copolymer having been selectively hydrogenated to saturate at least 80 percent of the olefinic double bonds and 0 to 25 percent of the aromatic double bonds.

Because of the rather recent concern with environmental considerations, it is especially desirable to be able to apply protective coatings to various substrates such as glass bottles in a non-polluting manner. The use of solid powder particles to coat these substrates eliminates the need for solvent and the accompanying environmental problems. In this connection, see U.S. Pat. No. 3,737,401.

When the powder particles are deposited upon a substrate such as a glass bottle, the particles must be heated to provide a uniform molten coating on the glass bottle. The coating is then cooled to provide a uniform solid coating on the bottle.

When certain thermoplastic elastomers such as styrene/butadiene/styrene block copolymers are used as a major component of the powder particles, the melt flow of the thermoplastic elastomers is not sufficient to provide a uniform molten coating. Although it is known to use copolymers of alphamethylstyrene and styrene with certain elastomers to produce pressure sensitive adhesives and to use such additives in hot melt coatings (see U.S. Pat. No. 3,932,332), the use of this additive does not provide sufficient flow in thermoplastic elastomers at temperatures below that at which the thermoplastic elastomer discolors.

It is also known to use hydrogenated aromatic hydrocarbon petroleum resins as tackifiers for polymers such as styrene/isoprene/styrene block copolymers in a hot melt adhesive. For example, U.S. Defensive Publication T917008 discloses a hot melt adhesive containing a tackifier which is derived from a polymerized cracked naphtha fraction and having a boiling point between −10° and 280° C. This fraction contains polymerizable unsaturated hydrocarbons, inert paraffins and alkyl benzenes. The polymerizable unsaturated hydrocarbons present in the fraction include aromatic olefins, cyclic olefins, cyclic diolefins, aliphatic olefins and aliphatic diolefins. Of the unsaturated hydrocarbon content, at least about 50% by weight, consists of a mixture of aromatic olefins, cyclic olefins and cyclic diolefins. The aromatic olefins present in the petroleum fraction include styrene, alpha-methylstyrene, vinyl toluene, vinyl xylene, propenyl benzene, indene, methyl indene, ethyl indene, and the like. The cyclic olefins and cyclic diolefins include cyclopentene, cyclopentadiene, dicyclopentadiene, cyclohexene, cyclooctene, and the like. The aliphatic olefins and aliphatic diolefins include butene, butadiene, pentene, pentadiene, octadiene, and the like.

The problem of melt flow of the thermoplastic elastomers exists not only with respect to coatings useful for glass bottles but also for other coating applications and for large part molding such as roto casting.

The search has continued for improved powder coating compositions useful in coating applications such as in coating glass bottles to protect against the scattering of broken glass. This invention was made as a result of that search.

OBJECTS AND SUMMARY OF THE INVENTION

Accordingly, a general object of the present invention is to avoid or substantially alleviate the above problems of the prior art.

A more specific object of the present invention is to provide a powder coating composition useful in coating glass bottles to protect against the scattering of broken glass.

Another object of the present invention is to provide a powder coating composition which when molten possesses sufficient flow under zero shear conditions to provide, upon cooling, a uniform coating of the glass bottle.

Still another object of the present invention is to provide a powder composition which is generally useful in applications where good melt flow is desired under zero shear conditions.

Another object of the present invention is to provide a method for preparing such a powder composition.

Yet another object of the present invention is to provide a glass container coated with a composition which will prevent the scattering of glass upon breakage.

A further object of the present invention is to provide a method for coating a glass container with a composition which will prevent the scattering of glass upon breakage.

Other objects and advantages of the invention will become apparent from the following summary and description of the preferred embodiments of the present invention.

In one aspect, the present invention provides a powder composition useful for coating applications comprising a melt blend mixture of (a) a block copolymer which is selectively hydrogenated to at least some degree and having at least two kinds of polymer blocks wherein one polymer block is designated by A and a second polymer block is designated by B such that prior to hydrogenation, (1) each A is a polymer end block of a monovinyl or alpha alkyl monovinyl arene having a number average molecular weight in the range of from about 5,000 to about 75,000, the blocks A comprising from about 5 to about 50% by weight of total block copolymer, and (2) each B is a polymer mid block having a number average molecular weight of from about 30,000 to about 300,000, and formed from a conjugated diene selected from homopolymers of at least one conjugated diene having 4 to 10 carbon atoms per molecule, the blocks B comprising from about 50 to about 95% by weight of the total block copolymer, and (b) at least one melt flow modifier selected from the group consisting of (1) monovinyl arene homopolymers
(2) alpha alkyl monovinyl arene homopolymers, and
(3) copolymers of monovinyl arenes and alpha alkyl monovinyl arenes wherein the aromatic portions of the polymer described in (b) (1), (2) and (3) are at least partially hydrogenated to remove the aromatic character thereof, wherein the powder composition possesses good melt flow characteristics under zero shear conditions.

In another aspect, the present invention provides a process for preparing this powder composition. This process comprises (A) melt blending a mixture of (1) a block copolymer which is selectively hydrogenated to at least some degree and having at least two kinds of polymer blocks wherein one polymer block is designated by A and a second polymer block is designated by B such that prior to hydrogenation (a) each A is a polymer block of a monovinyl or alpha alkyl monovinyl arene having a number average molecular weight in the range of from about 5,000 to about 75,000, the blocks A comprising from about 5 to about 50% by weight of the total block copolymer, and (b) each B is a polymer block having a number average molecular weight of from about 30,000 to about 300,000 and formed from a conjugated diene selected from homopolymers of at least one conjugated diene having 4 to 10 carbon atoms per molecule, the blocks B comprising from about 50 to about 95% by weight of the total block copolymer, and (2) at least one melt flow modifier selected from the group consisting of (a) monovinyl arene homopolymers,
(b) alpha alkyl monovinyl arene homopolymers, and
(c) copolymers of monovinyl arenes and alpha alkyl monovinyl arenes wherein the aromatic portions of the polymer described in (2) (a), (b) and (c) are at least partially hydrogenated to remove the aromatic character thereof, to produce a molten mixture;

(B) cooling the mixture to form a solid composition,
(C) pelletizing the solid composition, and
(D) grinding the pellets to desired particle size.

In still another aspect of the present invention, there is provided a glass container coated with the above described powder composition.

In yet another aspect of the present invention, there is provided a method for coating a glass container with the above described powder composition. This method comprises (1) preheating a glass container,
(2) applying on the external wall surface of the container the powder composition described above,
(3) baking the coated container until the powder particles become molten and form a smooth molten coating on the glass surface, and
(4) cooling the coated container to substantially ambient temperatures.

The essence of the present invention is the discovery that a limited group of polymeric compounds are useful in modifying the melt flow of thermoplastic elastomers such that the molten composition comprising the modifier and the elastomer possesses sufficient melt flow to produce a coating which, when cooled to a solid, will firmly adhere to a substrate such as glass.

DESCRIPTION OF THE PREFERRED EMBODIMENTS

Thermoplastic elastomers are polymeric materials that behave in some ways like thermoplastics and in other ways like elastomers. They behave like thermoplastics in that above their softening point they may be processed using ordinary plastics processing equipment. For example, they may be formed by thermoplastic injection molding, extrusion, blow molding, or vacuum forming. On the other hand, when utilized below their softening point, they behave like elastomers, i.e., they exhibit the properties normally associated with vulcanized rubbers without having been subjected to vulcanization. Thus, such polymers have the elastic and resilient properties of rubber but may be processed and reprocessed like ordinary thermoplastics.

The thermoplastic copolymers useful in the present invention are block copolymers having at least two kinds of polymer blocks. Copolymers useful in the present invention are described in "Applied Polymer Science," Chapter 29, p. 394ff, of *Organic Coatings and Plastics Chemistry* (Craver & Tess, 1975) which is hereby incorporated by reference.

Preferred block copolymers for use in the present invention are radial or branched block copolymers. By "radial" or "branched" copolymers is meant copolymers having the general configuration

Z—(BA)n wherein each A group is a terminal block segment comprising a polymer made from a monovinyl or alpha alkyl monovinyl arene and each B is a block segment comprising a polymer made from a conjugated diene, Z is derived from a polyfunctional compound having at least three active sites, and n is not less than 3. The radial block copolymer, as herein defined, must have at least three block copolymer branches radiating from a nucleus Z.

The "Z" group which forms the nucleus from which the polymer blocks of the radial block copolymer radiate is derived from a polyfunctional compound having at least three reactive sites capable of reacting with a carbon-lithium bond. Types of polyfunctional compounds which can be used include the polyepoxides, polyisocyanates, polyimines, polyaldehydes, polyketones, polyanhydrides, polyesters, polyhalides and the like. A preferred polyfunctional compound is a silica containing compound.

The preparation of the preferred radial block copolymers of this invention may be by any technique known to those skilled in this art, such as those described in U.S. Pat. Nos. 3,932,327, 3,692,874 and 3,281,383, the disclosures of which are all hereby incorporated by reference.

These radial block copolymers are available commercially as Solprene thermoplastic elastomers.

An important subgroup of these block copolymers comprises those thermoplastic elastomers in which the olefinic double bonds in the diene polymer blocks are converted to saturated hydrocarbon units by selective hydrogenation of the preformed block copolymer. The object of the hydrogenation is to improve the environmental resistance of the olefinically unsaturated block copolymer, particularly its resistance to light, oxygen, ozone, and heat. The thermoplastic elastomeric block copolymers useful in the present invention are at least partially selectively hydrogenated as described in U.S. Pat. No. 3,810,957, which is hereby incorporated by reference.

The thermoplastic elastomers useful in the present invention comprise generally from about 5 to about 50, typically from about 10 to about 40, and preferably from about 15 to about 35% by weight monovinyl or alpha alkyl monovinyl arenes and generally from about 50 to about 95, typically from about 60 to about 90, and preferably from about 65 to about 85% by weight conjugated diene which is at least partially hydrogenated.

When the amount of monovinyl arene is greater than about 50% by weight, the thermoplastic elastomer becomes less rubbery and more plastic. Thus, as will be discussed in greater detail hereinbelow, such a thermoplastic elastomer may provide reduced glass fragment retention when applied to a bottle. When the amount of monovinyl arene is less than about 5% by weight, the final powder composition becomes more tacky, is essentially an unvulcanized rubber, and may have reduced adhesion to glass containers such as glass bottles.

The monovinyl arene or alpha alkyl monovinyl arene useful as the aromatic block of the thermoplastic elastomer includes styrenes, alpha alkyl styrenes, ring alkylated styrenes, such as vinyl toluene and t-butyl styrene, alpha, alpha dialkyl styrenes, ring halogenated styrenes such as the chlorostyrenes, vinyl naphthalenes and the like or mixtures thereof. Styrene and alpha methyl styrene are preferred.

These arene monomers may contain minor proportions, based on the arene, of copolymerizable monomers that have conjugated double bonds such as conjugated dienes, vinyl pyridines, and the like.

The conjugated dienes useful in preparing the thermoplastic elastomer include butadiene, alkyl substituted butadienes such as isoprene, 2,3-dimethyl butadiene, ethyl butadiene, methyl pentadiene, (piperylene) and the like, or mixtures thereof. The alpha, gamma conjugated butadienes are preferred. Unsubstituted alpha, gamma butadiene is particularly preferred.

The conjugated diene blocks also include diene copolymers containing up to 35% by weight in block B of a monovinyl arene such as styrene or alpha methyl styrene distributed therein in a non-block, i.e., random or tapered configuration.

A typical, but by no means exhaustive, list of suitable block polymers includes the following:
Polystyrene-polybutadiene-polystyrene,
Polystyrene-polyisoprene-polystyrene,
Polystyrene-polybutadiene (polybutadiene-polystyrene)$_{2-5}$,
Polystyrene-(polyisoprene-polystyrene)$_{2-5}$,
Polystyrene-poly(ethyl-butadiene)-polystyrene,
Polystyrene-poly(random butadiene-styrene)-polystyrene,
Poly(alpha-methylstyrene)-polybutadiene-poly (alpha-methylstyrene),
Poly(alpha-methylstyrene)-polyisoprene-poly (alpha-methylstyrene),
Poly(styrene-alpha-methylstyrene)-poly(butadiene-isoprene) (styrene-alpha-methylstyrene), and
Poly(vinylxylene)-polybutadiene-poly(vinylxlene).

The number average molecular weight of the thermoplastic elastomers useful in the present invention may be generally from about 15,000 to about 150,000, typically from about 30,000 to about 100,000, and preferably from about 50,000 to about 80,000. In general, the higher the number average molecular weight of the thermoplastic elastomer, the poorer its melt flow. However, the amount of monovinyl arene in the thermoplastic elastomer has a more significant effect on melt flow than the number average molecular weight of the thermoplastic elastomer.

The conjugated diene portion of the thermoplastic elastomer may be hydrogenated to any degree including substantially complete saturation whereas the aromatic portion is left substantially unhydrogenated, e.g., less than 5%, preferably less than 2% hydrogenated. The conjugated diene portions of the thermoplastic elastomers useful in the present invention are hydrogenated to generally at least about 10%, typically at least about 50%, and preferably at least about 98%. Substantially complete hydrogenation of the conjugated diene portion is preferred.

Thermoplastic elastomers which are at least partially hydrogenated are preferred for use in the present invention since these polymers have improved ultra violet light exposure stability, improved outdoor weatherability, and improved thermal stability. Also, unexpectedly, those polymers which are at least partially hydrogenated do not "blush" or absorb water when in contact with a caustic solution to the same extent as do those polymers which are not at least partially hydrogenated. By "blush" is meant that the coating acquires some degree of opaqueness when in contact with an aqueous solution.

The melt flow modifier useful in the present invention may be selected from the group consisting of monovinyl arene homopolymers, alpha alkyl monovinyl arene homopolymers, and copolymers of monovinyl arenes and alpha alkyl monovinyl arenes either with each other or with other comonomers. These modifiers must be at least partially hydrogenated. Copolymers of monovinyl arenes and alpha alkyl monovinyl arenes either with each other or with other comonomers are preferred. Copolymers of these compounds with each other are particularly preferred. Copolymers of monovinyl arenes and alpha alkyl monovinyl arenes which are not hydrogenated are described in U.S. Pat. No. 3,932,332 which is hereby incorporated by reference.

The monovinyl arenes useful in preparing the melt flow modifier include styrene, ring alkylated styrenes such as vinyl toluene and t-butyl styrene, vinyl naphthalenes, ring halogenated styrenes such as the chlorostyrenes, and the like and mixtures thereof. Styrene is a preferred monovinyl arene.

The alpha alkyl monovinyl arenes useful in preparing the melt flow modifier include alpha methyl styrene, ring alkylated alpha methyl styrenes, alpha, alpha dialkyl styrenes and the like and mixtures thereof. Alpha methyl styrene is a preferred alpha alkyl monovinyl arene.

Minor amounts of other monomers, i.e., generally less than about 50, typically less than about 25, and preferably less than about 10% by weight of the copolymers may also be incorporated within the copolymer. Such monomers include non-cyclic aliphatic compounds.

When a copolymer comprising substantially only monovinyl arenes and alpha alkyl monovinyl arenes is used as the melt flow modifier, the copolymer contains generally from about 10 to about 50, typically from about 15 to about 35, and preferably from about 20 to about 30% by weight monovinyl arene, and generally from about 50 to about 90, typically from about 65 to about 85, and preferably from about 70 to about 80% by weight alpha alkyl monovinyl arene. A particularly preferred copolymer comprising substantially only monovinyl arenes and alpha alkyl monovinyl arenes is a copolymer of styrene and alpha methyl styrene.

Not all compounds which are generally known to influence the melt flow of a polymer are useful in the present invention. For example, many compounds which have significant effects on the melt flow of polymers such as thermoplastic elastomers discolor at the temperature at which the compositions of the present invention must be raised to have satisfactory melt flow.

Many compounds could not be used as melt flow modifiers in combination with the thermoplastic elastomer because such compositions would not have satisfactory melt flow. For example, compositions which have a melt index less than about 2.0 grams per ten minutes at 200° C. do not have satisfactory melt flow. (For details of the melt index test, see ASTM D-1238.) Even some of those compositions which have a melt index greater than about 2.0 grams per 10 minutes at 200° C. are not useful in the present invention since in the melt index test, there is a force which pushes the material through an orifice whereas when powders are melted on a substrate, no force is applied to the molten powder particles. Thus, the compounds useful as melt flow modifiers in the present invention must result in a final composition having sufficient melt flow under zero shear conditions.

Some compounds will form a mixture with the thermoplastic elastomer which has a melt index greater than 2.0 but are not compatible with the thermoplastic elastomer and thus result in opaque compositions. Others are compatible but do not provide enough plasticization to the phases to allow them to flow under zero shear. Finally, some compounds which are otherwise acceptable as melt flow modifiers are not useful in compositions used to coat glass bottles because they do not provide compositions which possess sufficient fragment retention.

Unlike the copolymers described in U.S. Pat. No. 3,932,332, the polymers useful as the melt flow modifiers in the present invention must be at least partially hydrogenated, i.e., at least part of the arene nuclei must be saturated. If the arene nucleus is benzene, the hydrogenated product would thus be cyclohexane. The melt flow modifiers of the present invention are generally at least about 20, typically at least 25, and preferably from about 30 to about 90% hydrogenated.

A preferred copolymer of styrene and alpha methyl styrene is a random copolymer which is at least 20% hydrogenated.

Preferred melt flow modifiers for use in the present invention include the Hercules XPS series. Hercules XPS 313 polymer is a random copolymer comprising 25% styrene and 75% alpha methyl styrene. This copolymer is about 35% hydrogenated, has a softening point range between 42° and 62° C., has a number average molecular weight of 738, a weight average molecular weight of 1230, and a molecular weight distribution of 1.7. Hercules XPS 541 polymer is a random copolymer comprising 25% styrene and 75% alpha methyl styrene. This copolymer is about 65% hydrogenated, has a softening point range between 45° and 65° C., has a number average molecular weight of 725, a weight average molecular weight of 1120, and a molecular weight distribution of 1.5. Hercules XPS 651 polymer is a random copolymer comprising 25% styrene and 75% alpha methyl styrene. This copolymer is about 65% hydrogenated, has a softening point range between 20° and 40° C., has a number average molecular weight of 410, a weight average molecular weight of 950, and a molecular weight distribution of 2.5. Hercules XPS 657 polymer is a random copolymer comprising 25% styrene and 75% alpha methyl styrene. This copolymer is about 100% hydrogenated, and has a softening point range between 31° and 51° C. Mixtures of two or more melt flow modifiers may also be used although certain mixtures of such modifiers tend to produce a certain haziness in the final coating. For example, the use of a mixture of Hercules XPS 657 and Hercules XPS 651 modifiers results in a hazy coating.

By solubility parameter is meant the square root of the cohesive energy density. For a detailed discussion of this term, see "Polymer Handbook" Section IV, pp. 341–68 by Brandrup, J & Immergut, E. H. (Interscience Division of John Wiley & Sons, N.Y., N.Y., 1966). The melt flow modifiers useful in the present invention may be chosen on the basis of their solubility parameters. The preferred melt flow modifier for a particular thermoplastic elastomer should have a solubility parameter between the solubility parameter of the aromatic portion and the conjugated diene or saturated diene portion of the thermoplastic elastomer. For example, a particularly preferred thermoplastic elastomer comprises 80% by weight substantially totally hydrogenated butadiene (having a solubility parameter of about 8) and 20% by weight styrene (having a solubility parameter of about 9). When this particularly preferred thermoplastic elastomer is employed, the melt flow modifier should have a solubility parameter of generally from about 6 to about 11, typically from about 7 to about 10, and preferably from about 8 to about 9.

In the present invention there is employed generally from about 25 to about 90, typically from about 45 to about 75, and preferably from about 50 to about 70% by weight thermoplastic elastomer and generally from about 10 to about 75, typically from about 25 to about 55, and preferably from about 30 to about 50% by weight melt flow modifier.

The required amount of melt flow modifier needed to provide sufficient melt flow depends upon the percentage of aromatic rings in the thermoplastic elastomer moiety. For example, when a thermoplastic elastomer comprising styrene and hydrogenated butadiene is employed, less melt flow modifier is needed to get sufficient flow when there is more hydrogenated butadiene. Thus, if the thermoplastic elastomer contains 70% hydrogenated butadiene and 30% styrene, it has been found that about 50% by weight of Hercules XPS 541 copolymer is needed for sufficient flow whereas when the thermoplastic elastomer contains 80% hydrogenated butadiene and 20% styrene, only about 40% by weight Hercules XPS 541 copolymer is needed.

It has also been found that as the percentage of melt flow modifier increases, the poorer the glass fragment retention of the powder composition as noted hereinabove. To decrease the amount of melt flow modifier needed, a thermoplastic elastomer having an increased amount of conjugated diene may be used. However, it has been noted that as the amount of conjugated diene relative to monovinyl arene increases, the final powder composition becomes more tacky and less stable during cryogenic grinding.

The melt flow modifier useful in the present invention must contain aromatic portions which are at least partially hydrogenated in order that the melt flow modifier will be compatible with both the aromatic and aliphatic portions of the thermoplastic elastomers. The aromatic portion of the melt flow modifier is compatible with the aromatic portion of the thermoplastic elastomer and the hydrogenated or saturated portion of the melt flow modifier is compatible with the aliphatic portion of the thermoplastic elastomer.

In a preferred embodiment of the present invention, other materials known to those skilled in this art may be added to the composition of the present invention. These materials include adhesion promoters and stabilizers.

The adhesion promoters useful in the present invention are preferably silanes but, in the broadest aspect of the present invention, adhesion promoters such as titanates, isocyanates, epoxies, phenoxies, or others known to those skilled in the art may be employed. The preferred adhesion promoters are substituted silanes or their corresponding silanols (i.e., the partially or fully hydrolyzed drivative of the silane) or the corresponding siloxanes (the polymeric form of the silanol) or mixtures of the silane, silanol and siloxane. The silane has the general formula:

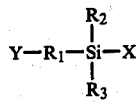

wherein Y is selected from the group consisting of mercapto, epoxy, amino, polymeric amino, methacryloxy, n-alkyls, aryls, halogenated derivatives of the foregoing and mixtures thereof: $R_1$ is selected from the group consisting of alkylene, isoalkylene, and cycloalkylene, each of 2 to 16 carbon atoms; X is selected from the group consisting of a halogen, hydroxyl, alkoxy, and acyloxy group; $R_2$ and $R_3$ are selected independently from the group consisting of $Y-R_1-$, $X-$, and methyl. The $R_1$ group may also contain more than one substituent group so long as no single carbon atom holds more than one such group. condensation products of the substituted alkyl silanes are also applicable.

Illustrative of suitable silanes within this structural formula are: gamma-glycidoxypropyl trimethoxysilane, beta-(3,4-epoxycyclohexyl)ethyl trimethoxysilane, beta-glycidoxyethyl triethoxysilane, beta-(3,4-epoxycyclohexyl) ethyl tri (beta-methoxyethoxy) silane, beta-(3-epoxyethylphenyl) ethyl trimethoxysilane, gamma-glycidoxypropyl dimethyl methoxy-silane, beta-(epoxyethyl) ethyl triethoxysilane, 4,5-epoxy-n-hexyl trimethoxysilane, 7,8-epoxy-n-octyl tripropoxysilane, 15,16-epoxy-n-hexadecyl trimethoxysilane, 3-methylene-7-methyl-6,7-epoxyoctyl trimethoxysilane, and their corresponding silanols and siloxanes; the mercapto alkyl silanes such as beta-mercaptoethyl trimethoxysilane, beta-mercaptopropyl trimethoxysilane, beta-(2-mercaptocyclohexyl) ethyl trimethoxysilane, beta-mercaptoethyl triethoxysilane, gamma-mercaptopropyl dimethyl methoxy-silane, beta-mercaptoethyl triacetoxysilane, and their corresponding silanols and siloxanes.

The adhesion promoters may generally be added to the melt in liquid form, i.e., in 100% concentration or as a dispersion in water, in $C_4$–$C_{16}$ hydrocarbon solvents such as pentane, hexane, heptane, benzene, toluene, xylene, etc., or in organic solvents such as $C_2$–$C_6$ alkanols (e.g., isopropyl alcohol, sec.-butyl alcohol, etc.) $C_3$–$C_8$ ketones (e.g. acetone, methylethyl ketone, etc.) and chlorinated alkanes such as carbon tetrachloride, chloroform and ethylene dichloride. For the purpose of convenience herein and in the appended claims, the term "silane" will be understood to include the unhydrolyzed form (i.e. the silane), the partially or fully hydrolyzed form (i.e. the silanol), the condensation products resulting from the partially or fully hydrolyzed form of the silane (i.e., the siloxane, also known as polysiloxane), and mixtures of the aforesaid forms.

A particularly preferred adhesion promoter is gamma-glycidoxypropyl-trimethoxy silane. A mixture of two or more adhesion promoters may also be used.

The total amount of adhesion promoter may be incorporated within the powder particles. However, the powder composition may be slurried in a dispersion of an adhesion promoter such as a silane in a suitable volatile solvent followed by evaporation of the solvent. The powder composition is then coated with the adhesion promoter.

Finally, if the final powder composition is to be applied to a glass container, part or all of the adhesion promoter may be applied as a primer coat directly to the glass container itself.

The amount of adhesion promoter useful in the present invention is generally less than about 10% by weight of the entire powder composition. When the preferred silane adhesion promoters are employed, the amount of silane is generally less than about 8, typically from about 1 to about 6, and preferably from about 2 to about 5% by weight based upon the weight of the total composition.

The upper limit of this amount is determined by economic considerations and also by the fact that too large an amount of adhesion promoter might be incompatible with the rest of the powder composition and result in some degree of haziness.

As noted hereinabove, part of the adhesion promoter may be added as a primer coat directly to the surface to be coated rather than including it within the powder particles. Alternatively, instead of incorporating all of the adhesion promoter within the particle or applying part of the adhesion promoter as a primer coat, part of the adhesion promoter may be applied as a film surrounding the final powder particle. This film increases the adhesion of the particles to the bottle surface. Combinations of these methods may also be used.

Stabilizers may also be used in the composition of the present invention especially if the coated article is to have a long life. For example, a stabilizer against oxidation during heating and aging and stabilizers against weathering (U.V. stabilizers) may be added in amounts of generally less than about 10, typically from about 0.5 to about 5, and preferably from about 1 to 3% by weight of the entire powder composition.

Such stabilizers are known to those skilled in the art and include Uvinul 400 2,4-dihydroxy-benzophenone, Tinuvin 326 substituted hydroxyphenyl benzotriazole, Tinuvin P substituted benzotriazole, Permasorb MA 2-hydroxy-4-(2-hydroxy-3-methacrylyloxy) propiobenzophenone, Eastman OPS octylphenyl salicylate, Eastman RMB resorcinol monobenzoate, Antioxidant 330 1,3,5-trimethyl-2,4,6-tris (3,5-ditert-butyl-4-hydroxybenzyl) benzene, Irganox 1076 octadecyl 3-(3,5-ditertbutyl-4-hydroxyphenyl) propionate, Irganox 1010 tetrabis methylene 3-(3,5-ditert-butyl-4 hydroxyphenyl)-propionate methane, Irganox 565 2(4-hydroxy-3,5-tertiary butyl anilino)4,6-bis (n-octyl thio) 1,3,5-triazine, Butazate zinc dibutyldithiocarbamate, Plastanox 2246 2,2-methylene-bis (4-methyl-6-tertiary butyl phenol), Plastanox 425 2,2'-methylene bis (4-ethyl-6-tert-butyl phenol), Santowhite Crystals 4,4-thiobis-(6-tertiary-butyl m-cresol), Polygard tri (nonylated phenyl) phosphite, NBC nickel dibutyl dithiocarbamate, and Pennzone B dibutyl thiourea. A preferred stabilizer for use as an antioxidant during heating and aging is Irganox 1010.

Mixtures of two or more of these stabilizers may also be used.

The powder composition of the present invention may be prepared by first melt blending a composition comprising the thermoplastic elastomer and melt flow modifier. This melt blending step may take place in any apparatus known to those skilled in this art. Such apparatus include a Brabender Plastograph and a Werner Pfleiderer ZSK twin screw melt extruder.

This melt blending step must be carried out at a temperature which is high enough to provide sufficient flow while the composition is molten but low enough so that the composition does not discolor. Such temperatures are generally from about 100 to about 250, typically from about 120 to about 200, and preferably from about 130 to about 160.

The thermoplastic elastomers useful in the present invention appear to have a critical temperature for breakup of the domains within the polymer. This critical temperature is believed to be a function of the molecular weight of the two segments, the chemical composition and differential solubility parameter between the two phases.

The molten composition must next be cooled until it solidifies. Cooling may be done in air or by passing the molten material through a water bath. When a silane is used as an adhesion promoter in the present invention, the molten composition is preferably air cooled. Water contact with the silane should be kept to a minimum since water appears to affect the adhesion properties of the silane.

The solid composition is then pelletized and the pellets are ground to desired particle size.

The particles may be ground by using any apparatus known to those skilled in this art. Such apparatus include the Micropul pulverizer, an Abbe mill, a Wiley mill and pin mills.

Since the embrittlement temperature of the thermoplastic elastomer is generally less than about $-30$, typically less than about $-100$, and preferably less than about $-125°$ C., the powder mixture should be comminuted at temperatures generally less than about $-30$, typically less than about $-100$, and preferably less than about $-125°$ C.

The particle size of the powders produced in accordance with the present invention depends upon their ultimate end use and mode of application. These powder particles may be applied to a surface to be coated by any means known to those skilled in this art. For example, the powder particles can be applied by electrostatic spray or by fluidized bed techniques. If fluidized bed techniques are employed, the powder particles may generally be larger than when electrostatic spray techniques are used.

The particle size of this powder composition may be generally from about 50 to about 300, typically from about 75 to about 250, and preferably from about 100 to about 200 micrometers. The lower limit of particle size is based principally upon the economics of low temperature grinding whereas the upper limit is set because of the need to achieve smooth coating and ease of application with finer powders.

The present process may be carried out in a batch, continuous, or semi-continuous manner as described.

The powder particles produced according to the present invention are generally useful in any application where good melt flow is needed under zero shear conditions. Such applications include roto-casting and coating of containers, particularly glass bottles. This latter utility is described in U.S. Patent application Ser. No. 844,812, entitled "Powder Composition and Method of Preparation," filed concurrently herewith by Martin J. Hannon and Richard K. Greene. This utility is also disclosed in U.S. Patent application Ser. No. 844,820, entitled "Coated Bottle and Method of Coating," filed concurrently herewith by Martin J. Hannon, Alex S. Forschirm, aand Richard K. Greene. The disclosures of these two patent applications are hereby incorporated by reference.

Bottles coated with the compositions of the present invention are fragment retentive. By "fragment retentive" is meant that there is a certain degree of glass retention when a filled glass bottle is dropped according to the following test procedure. The test bottles are weighed and then filled with 0.1 molar citric acid/water solution from a stock solution.

Three and six-tenths percent of the volume is displaced with a stainless steel plug of exact size so as to leave a 3.6% headspace when removed. Then 0.4 grams/fluid ounce of Lilly OSP 650 mg. sodium bicarbonate tablets are added to the bottles. The bottle is immediately capped and allowed to equilibrate overnight at 72° C. The bottles should have a pressure of approximately 60 psi as tested by a Zahm and Nagel model DT piercing device.

The pressurized bottles are then tested for fragment retention in a bottle drop chamber. The bottle drop chamber comprises a platform on an electrically operated lift with a calibrated height control and a remote electrical platform release. The platform is centered over a heavy stainless steel plate approximately three square feet which is set in concrete. The chamber is enclosed for safety with heavy rubberized fabric and a Plexiglass observation panel.

The pressurized bottles are placed sideways on the drop platform at a height of 4 feet, the chamber is closed, and the platform released. All pieces of glass within a 3 foot diameter circle are collected, dried and weighed. The ratio of the final weight of the glass pieces divided by the original bottle weight, expressed as a percentage, is the percentage retention.

The glass bottles coated with the powder composition of the present invention have glass fragment retention of generally at least about 50%, typically at least about 85, and preferably at least about 95%.

Glass containers may be coated with the powder composition of the present invention in order to prevent the scattering of glass fragments upon breakage of the glass container. Preferred glass containers are glass bottles. Pressurized glass bottles are particularly preferred for coating with the powder composition of the present invention.

This process for coating glass containers comprises (a) preheating the glass container, (b) applying on the external wall surface of the container the powder composition described above, (c) baking the coated container until the powder particles become molten and form a smooth, molten coating on the glass surface, and (d) cooling the coated container to substantially ambient temperatures.

The preheating step is carried out for the purpose of facilitating the immediate adhesion of the powder particles to the glass container. The glass containers are first placed in an oven for this purpose. The temperature used in the preheat oven depends upon the composition of the powder particles that will be sprayed. Temperatures generally from about 100 to about 350, typically from about 125 to about 300, and preferably from about 150 to about 180° C., may be employed.

The amount of time the bottles are in the preheat oven also depends upon the composition of the powder particles that will be sprayed onto the bottles. Residence times of generally from about 0.5 to about 40, typically from about 5 to about 15, and preferably from about 10 to about 20 minutes may be employed.

Any electrostatic spraying device known to those skilled in this art may be employed to spray the powder particles. Such devices include a Gema electrostatic spraying gun, a DeVilbiss electrostatic spraying gun, and a Nordson electrostatic spraying gun.

While the powder particles are being sprayed onto the container, the container may be gently turned by a low speed stirring motor. When the container is sufficiently coated with the powder particles, it is removed for baking. At this point, the preheated container still looks white and powdery. It is fused but not melted at this point.

The pressure which is required to feed the powder particles through the electrostatic spraying gun is dependent upon the stability rating of the powder particles. The powder particle stability rating is a qualitative rating and ranges from 1 to 5 with a powder having a rating of 1 defined as a free flowing powder having no lumps and capable of being stored without agglomeration. A powder having a rating of 2 is defined as one which has lumps which can be broken up with mild agitation. A powder having a rating of 3 is defined as one which has lumps which can be broken up only with violent agitation. A powder having a rating of 4 is defined as one which contains large lumps which cannot be broken up even with violent agitation. A powder having a rating of 5 is defined as a completely coalesced lump of polymer.

When the powder stability rating approaches 1, the pressure within the electrostatic spray gun is relatively uniform whereas when the powder stability rating approaches 5, the pressure within the feed system fluctuates due to the blocking caused by the larger particles.

After being sprayed, the glass container is placed in an oven which is at a temperature of generally from about 180° to about 300°, typically from about 200° to about 240°, and preferably from about 215° to about 235° C. for generally from about 1 to about 40, typically from about 10 to about 30, and preferably from about 15 to about 25 minutes.

The glass container should not be subjected to high temperatures over long periods of time since some discoloration of the coating may take place. On the other hand if the temperature is too low and the residence time too short, the powder composition may not flow enough to produce a smooth coating.

The glass container is then removed from the oven and allowed to air cool to room temperatures.

The present invention is further illustrated by the following example. All parts and percentages in the example as well as in the specification and claims are by weight unless otherwise specified.

EXAMPLE

A composition comprising 2678.6 grams of a Solprene thermoplastic elastomer having a number average molecular weight of 70,000, 1589 grams of Hercules XPS 541 random copolymer of 25% by weight of styrene and 75% by weight alpha methylstyrene (approximately 65% hydrogenated), 181 grams of Union Carbide A187 gamma-glycidoxypropyl-trimethoxy silane and 90.8 grams of Irganox 1010 tetra-bis methylene 3-(3,5-ditertiary-butyl-4-hydroxphenyl)- propionate methane are placed in a Werner-Pfleiderer twin screw melt extruder at 135° C. The thermoplastic elastomer comprises a block copolymer comprising 20% styrene having a number average molecular weight of 16,000, and 80% hydrogenated butadiene having a number average molecular weight of 60,000, wherein the styrene blocks are on the end of the polymer and the hydrogenated butadiene blocks are midblocks. The conjugated diene is substantially completely hydrogenated, i.e., more than about 98% of the double bonds are saturated. The hydrogenated butadiene mid-block contains about 84% ethylene groups and about 16% butylene groups.

When the molten composition exits from the extruder it is air cooled to room temperature (about 25° C.) and then chopped into a coarse powder. The powder is then re-extruded in the same manner to obtain a more uniform composition. The extrudate is then re-ground to form a powder. The coarse powder is then placed in a Micropul pulverizer and cryogenically ground using liquid nitrogen at a temperature of about −190° C. The coarse powder is ground to a fine powder having a diameter of about 250 micrometers.

The particles are applied by electrostatically spraying (using a Gema electrostatic spray gun) onto a 64 fluid ounce glass bottle which has been preheated to about 150° C. The coated bottle is then baked in a forced convection oven at 225° C. for 20 minutes until a rather smooth coating is produced. The coated bottle is then cooled to room temperature.

The bottle has a coating which is substantially clear such that one can read through the bottle, writing, which is on normal typewritten page. The page is wrapped around the outside of the bottle with the typed portion facing toward the inside of the bottle.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

We claim:

1. A powder composition useful for coating applications comprising a melt blend mixture of from about 25 to about 90% by weight of
    (a) a block copolymer which is selectively hydrogenated to at least some degree and having at least two kinds of polymer blocks wherein one polymer block is designated by A and a second polymer block is designated by B such that prior to hydrogenation,
        (1) each A is a polymer end block of a monovinyl or alpha alkyl monovinyl arene having a number average molecular weight in the range of from about 5,000 to about 75,000, said blocks A comprising from about 5 to about 50% by weight of the total block copolymer, and
        (2) each B is a polymer mid block having a number average molecular weight of from about 30,000 to about 300,000, and formed from a conjugated diene selected from homopolymers of at least one conjugated diene having 4 to 10 carbon atoms per molecule, said blocks B comprising from about 50 to about 95% by weight of the total block copolymer, and
    (b) from about 10 to about 75% by weight of at least one melt flow modifier selected from the group consisting of
        (1) monovinyl arene hompolymers,
        (2) alpha alkyl monovinyl arene homopolymers, and
        (3) copolymers of monovinyl arenes and alpha alkyl monovinyl arenes,
    wherein the aromatic portions of the polymers described in (b)(1), (2) and (3) are at least partially hydrogenated to remove the aromatic character thereof,
wherein said powder composition possesses good melt flow characteristics under zero shear conditions.

2. The powder composition of claim 1, wherein the block copolymer has a number average molecular weight of from about 15,000 to about 150,000.

3. The powder composition of claim 1, wherein said composition additionally contains less than about 8% by weight of an adhesion promoter selected from the group consisting of substituted silanes, the corresponding silanols, siloxanes, and mixtures thereof.

4. The powder composition of claim 3, wherein said composition additionally contains less than about 10% by weight of at least one member of the group consisting of stabilizers against oxidation and stabilizers against ultraviolet light.

5. The powder composition of claim 4, wherein said monovinyl arene portion of said block copolymer is styrene and wherein said conjugated diene portion of said block copolymer is unsubstituted alpha, gamma butadiene.

6. The powder composition of claim 1, wherein said melt flow modifier is a partially hydrogenated copolymer consisting essentially of styrene and alpha methyl styrene.

7. The powder composition of claim 6, wherein said copolymer of styrene and alpha methyl styrene is a random copolymer which is at least 20% hydrogenated.

8. The powder composition of claim 7, wherein said random copolymer of styrene and alpha methyl styrene comprises from about 10 to about 50% by weight styrene and from about 50 to about 90% by weight alpha methyl styrene.

9. The powder composition of claim 4, wherein said adhesion promoter is gamma-glycidoxypropyl-trimethoxy silane and said stabilizer against oxidation is tetrabis methylene 3-(3,5-ditert-butyl-4-hydroxyphenyl) propionate methane.

10. The powder composition of claim 4, wherein said monovinyl arene is styrene, said conjugated diene is alpha, gamma butadiene, and said block copolymer is at least about 10% hydrogenated.

11. The powder composition of claim 1, wherein the block copolymer is a radial block copolymer.

12. The powder composition of claim 1, wherein the powder particle size is from about 50 to about 300 micrometers.

13. A powder composition useful for coating applications comprising a melt blend mixture of
    (a) from about 25 to about 90% by weight of a block copolymer which is selectively hydrogenated to at least about 10% and having at least two kinds of polymer blocks wherein one block is designated by A and a second polymer block is designated as B such that prior to hydrogenation,
        (1) each A is a polymer end block of a monovinyl or alpha alkyl monovinyl arene having a number average molecular weight in the range of from about 5,000 to about 75,000, said blocks A comprising from about 10 to about 40% by weight of the total block copolymer, and
        (2) each B is a polymer mid block having a number average molecular weight of from about 30,000 to about 300,000, and formed from a conjugated diene selected from homopolymers of at least one conjugated diene having 4 to 10 carbon atoms per molecule, said blocks B comprising from about 60 to about 90% by weight of the total block copolymer,
    (b) from about 10 to about 75% by weight of at least one melt flow modifier selected from the group consisting of
        (1) monovinyl arene homopolymers,
        (2) alpha alkyl monovinyl arene homopolymers, and
        (3) copolymers of monovinyl arenes and alpha alkyl monovinyl arenes
    wherein the aromatic portions of the polymers described in (b)(1), (2) and (3) are at least partially hydrogenated to remove the aromatic character thereof,
    (c) less than about 8% by weight of at least one adhesion promoter, and
    (d) less than about 10% by weight of at least one member of the group consisting of stabilizers against oxidation and stabilizers against ultraviolet light, wherein said powder composition possesses good melt flow characteristics under zero shear conditions.

14. The powder composition of claim 13, wherein said powder composition contains from about 45 to about 75% by weight of the block copolymer and from about 25 to about 55% by weight of the melt flow modifier.

15. The powder composition of claim 13, wherein the block copolymer has a number average molecular weight of from about 30,000 to about 100,000.

16. The powder composition of claim 13, wherein said adhesion promoter is selected from the group consisting of substituted silanes, the corresponding silanols, siloxanes, and mixtures thereof.

17. The powder composition of claim 16, wherein said stabilizer is tetra-bis methylene 3-(3,5-ditert-butyl-4 hydroxyphenyl)-propionate methane.

18. The powder composition of claim 17, wherein said monovinyl arene portion of said block copolymer is styrene and wherein said conjugated diene portion of said block copolymer is unsubstituted alpha, gamma butadiene.

19. The powder composition of claim 13, wherein said melt flow modifier is a partially hydrogenated copolymer consisting essentially of styrene and alpha methyl styrene.

20. The powder composition of claim 19, wherein said copolymer of styrene and alpha methyl styrene is a random copolymer which is at least about 25% hydrogenated.

21. The powder composition of claim 20, wherein said random copolymer of styrene and alpha methyl styrene comprises from about 15 to about 35% by weight styrene and from about 65 to about 85% by weight alpha methyl styrene.

22. The powder composition of claim 17, wherein said adhesion promoter is gamma-glycidoxypropyl-trimethoxy silane.

23. The powder composition of claim 17, wherein said monovinyl arene is styrene, said conjugated diene is alpha, gamma butadiene, and said block copolymer is at least about 50% hydrogenated.

24. The powder composition of claim 13, wherein the block copolymer is a radial block copolymer.

25. The powder composition of claim 13, wherein said conjugated diene portion of said block copolymer is at least about 50% hydrogenated.

26. The powder composition of claidm 13, wherein said composition contains from about 1 to about 6% by weight of at least one adhesion promoter and from about 0.5 to about 5% by weight of at least one stabilizer.

27. The powder composition of claim 13, wherein the powder particle size is from about 75 to about 250 micrometers.

28. A powder composition useful for coating applications comprising a melt blend mixture of
(a) from about 50 to about 70% by weight of a block copolymer which is selectively hydrogenated to at least about 98% and having at least two kinds of polymer blocks wherein one polymer block is designated by A and a second polymer block is designated by B such that prior to hydrogenation,
(1) each A is a polymer end block comprising styrene and having a number average molecular weight in the range of from about 5,000 to about 75,000, said blocks A comprising from about 15 to about 35% by weight of the total block copolymer, and
(2) each B is a polymer mid block having a number average molecular weight of from about 30,000 to about 300,000, and comprising a polymer formed from alpha, gamma butadiene, said blocks B comprising from about 65 to about 85% by weight of the total block copolymer,
(b) from about 30 to about 50% by weight of at least one melt flow modifier comprising copolymers of monovinyl arenes and alpha alkyl monovinyl arenes, wherein the aromatic portions of said modifier are about 30 to about 90% hydrogenated to remove the aromatic character thereof,
(c) from about 2 to about 5% by weight of at least one adhesion promoter selected from the group consisting of substituted silanes, the corresponding silanols, siloxanes, and mixtures thereof, and
(d) from about 1 to about 3% by weight of at least one stabilizer against oxidation and at least one stabilizer against ultraviolet light,
wherein said powder composition possesses good melt flow characteristics under zero shear conditions and has a particle size of from about 100 to about 200 micrometers.

29. A process for preparing a powder composition useful for coating applications and possessing good melt flow characteristics under zero shear conditions, said process comprising
(A) melt blending a mixture of from about 25 to about 90% by weight of
(1) a block copolymer which is selectively hydrogenated to at least some degree and having at least two kinds of polymer blocks wherein one polymer block is designated by A and a second polymer block is designated by B such that prior to hydrogenation,
(a) each A is a polymer end block of a monovinyl or alpha alkyl monovinyl arene having a number average molecular weight in the range of from about 5,000 to about 75,000, said blocks A comprising from about 5 to about 50% by weight of the total block copolymer, and
(b) each B is a polymer mid block having a number average molecular weight of from about 30,000 to about 300,000, and formed from a conjugated diene selected from homopolymers of at least one conjugated diene having 4 to 10 carbon atoms per molecule, said blocks B comprising from about 50 to about 95% by weight of the total block copolymer, and
(2) from about 10 to about 75% by weight of at least one melt flow modifier selected from the group consisting of
(a) monovinyl arene homopolymers,
(b) alpha alkyl monovinyl arene homopolymers, and
(c) copolymers of monovinyl arenes and alpha alkyl monovinyl arenes,
wherein the aromatic portions of the polymers described in (2) (a), (b), and (c) are at least partially hydrogenated to remove the aromatic character thereof,
(B) cooling said mixture to form a solid,
(C) pelletizing said solid mixture, and
(D) grinding said pellets to desired particle size.

30. The process of claim 29, wherein the block copolymer has a number average molecular weight of from about 15,000 to about 150,000.

31. The process of claim 29, wherein said composition additionally contains less than about 8% by weight of an adhesion promoter selected from the group consisting of substituted silanes, the corresponding silanols, siloxanes, and mixtures thereof.

32. The process of claim 31, wherein said composition additionally contains less than about 10% by weight of at least one member of the group consisting of stabilizers against oxidation and stabilizers against ultraviolet light.

33. The process of claim 32, wherein said monovinyl arene portion of said block copolymer is styrene and wherein said conjugated diene portion of said block copolymer is unsubstituted alpha, gamma butadiene.

34. The process of claim 29, wherein said melt flow modifier is a partially hydrogenated copolymer consisting essentially of styrene and alpha methyl styrene.

35. The process of claim 34, wherein said copolymer of styrene and alpha methyl styrene is a random copolymer which is at least 20% hydrogenated.

36. The process of claim 35, wherein said random copolymer of styrene and alpha methyl styrene comprises from about 10 to about 50% by weight styrene and from about 50 to about 90% by weight alpha methyl styrene.

37. The process of claim 32, wherein said adhesion promoter is gamma-glycidoxypropyl-trimethoxy silane and said stabilizer against oxidation is tetra-bis methylene 3-(3,5-ditert-butyl-4-hydroxyphenyl) propionate methane.

38. The process of claim 32, wherein said monovinyl arene is styrene, said conjugated diene is alpha, gamma butadiene, and said block copolymer is at least about 10% hydrogenated.

39. The process of claim 29, wherein the block copolymer is a radial block copolymer.

40. The process of claim 29, wherein the powder particle size is from about 50 to about 300 micrometers.

* * * * *